(12) United States Patent
Chambers et al.

(10) Patent No.: US 10,315,627 B2
(45) Date of Patent: Jun. 11, 2019

(54) METHOD OF CLEANING UNDERSIDE OF WHEELED OUTDOOR EQUIPMENT

(71) Applicants: Bryan Richard Chambers, Fort Myers, FL (US); Bryan Richard Chambers, Jr., Fort Myers, FL (US)

(72) Inventors: Bryan Richard Chambers, Fort Myers, FL (US); Bryan Richard Chambers, Jr., Fort Myers, FL (US)

( * ) Notice: Subject to any disclaimer, the term of this patent is extended or adjusted under 35 U.S.C. 154(b) by 501 days.

(21) Appl. No.: 15/008,642

(22) Filed: Jan. 28, 2016

(65) Prior Publication Data

US 2016/0137172 A1    May 19, 2016

Related U.S. Application Data

(63) Continuation of application No. 13/610,484, filed on Sep. 11, 2012, now abandoned.

(60) Provisional application No. 61/533,836, filed on Sep. 13, 2011.

(51) Int. Cl.
| | |
|---|---|
| *B08B 5/02* | (2006.01) |
| *B60S 3/04* | (2006.01) |
| *A47L 9/08* | (2006.01) |
| *A47L 5/14* | (2006.01) |
| *A47L 9/24* | (2006.01) |

(52) U.S. Cl.
CPC .............. *B60S 3/044* (2013.01); *A47L 5/14* (2013.01); *A47L 9/08* (2013.01); *A47L 9/248* (2013.01); *B08B 5/02* (2013.01)

(58) Field of Classification Search
CPC ... A47L 5/14; A47L 9/248; A47L 9/08; B08B 5/02; B60S 3/044
See application file for complete search history.

(56) References Cited

U.S. PATENT DOCUMENTS

| | | | | |
|---|---|---|---|---|
| 2,586,145 | A * | 2/1952 | Breuer | A47L 9/02 15/327.5 |
| 5,813,088 | A * | 9/1998 | Wagner | A47L 5/36 15/327.5 |
| 6,526,624 | B2 * | 3/2003 | Miyamoto | A47L 5/14 15/414 |
| 6,843,639 | B2 * | 1/2005 | Schutt | F04D 29/462 15/416 |
| 8,739,362 | B1 * | 6/2014 | Conder | E04D 13/0765 15/406 |
| 2004/0143931 | A1 * | 7/2004 | Dennis | A47L 5/14 15/414 |
| 2012/0234412 | A1 * | 9/2012 | Prager | E01H 1/0809 137/565.01 |

(Continued)

OTHER PUBLICATIONS

How to clean the tractor after mowing (Year: 2009).*

*Primary Examiner* — Alexander Markoff
(74) *Attorney, Agent, or Firm* — William E. Noonan

(57) ABSTRACT

A method of cleaning an underside of wheeled outdoor equipment includes attaching a blower extension pipe assembly to a power blower and positioning the extension pipe across the ground and under the equipment to be cleaned. The blower extension pipe includes an elbow end fitting with a blow-off opening that is directed to the underside of the equipment. The blower is operated to direct air through the blower extension pipe and against the underlying surface of the equipment to remove debris therefrom.

6 Claims, 4 Drawing Sheets

(56) References Cited

U.S. PATENT DOCUMENTS

2015/0237808 A1\* 8/2015 Prager ..................... A47L 5/14
15/405

\* cited by examiner

METHOD OF CLEANING UNDERSIDE OF WHEELED OUTDOOR EQUIPMENT

RELATED APPLICATION

This application is a continuation and claims the benefit of U.S. patent application Ser. No. 13/610,484 filed Sep. 11, 2012.

FIELD OF THE INVENTION

The present invention relates to a power working machine such as a leaf blower or power blower, which utilizes a high speed air stream to perform cleaning operations or the like. In particular, this invention uses a blower pipe extension assembly which is connected to the air blow-off port of a power blower and used to clean the underside of a lawn mower or other wheeled outdoor equipment.

BACKGROUND OF THE INVENTION

Power blowers or "leaf blowers" are small portable clean-up machines having a small electric or gasoline motor connected to an elongate tubular extension which is held in the hand of operator to direct a forceful stream of an air onto the surface to be cleaned. In some models, the motor is carried on the back of the operator in other models the motor is provided with a strap such that the blower is easily carried during the cleaning operations. The tubular extension has a sleeved nozzle which is slidably received on the end. The nozzle is formed of lightweight plastic material and terminates in either a round or rectangular shape depending upon the manufacturer. These lightweight, easily maneuverable blowers substantially reduce the time and labor required for many cleanup tasks and are used primarily for cleaning grass clippings and leaves from walks and driveways after cutting the lawn. They are also widely used in some areas of the country in removing snow.

There are several patents which disclose various blowers and brush combinations, none of which are suitable for use on or under the equipment, which is where the debris accumulates on the equipment that is used for the yard work or landscaping.

With respect to such conventional blower pipes as described above, there have been proposed one Richardson U.S. Pat. No. 5,054,159 that has a mounting flange, brush and scraper attachments. This is used for cleaning the pavement, walkways or concrete surfaces.

Henke, et al., U.S. Pat. No. 5,652,995. According to the invention, a lawn and garden blower has a nozzle which provides a comparatively wide pattern of high velocity air. At the exit of the nozzle, there are pluralities of high-efficiency tubular-shaped bores, arranged side-by-side, which divide the air stream entering the nozzle into a plurality of high-velocity air jets substantially parallel to each other. This product is also used to clean the ground of leaves, walkways and the like.

Power blower attachments have been developed for cleaning overhead structures such as gutters. See Conder, U.S. Pat. No. 8,739,362 and Dennis, US Publication No. 2004/0143931. Neither of these techniques is suitable for cleaning the underside of a lawn mower or other wheeled outdoor equipment positioned close to the ground. Indeed, of the referenced patents are considered and operated to blow the high speed air stream directly toward or parallel with the ground, and cannot be used for cleaning the underside of wheeled equipment.

SUMMARY OF THE INVENTION

The primary objective of the present invention is to provide a leaf blower or power blower extension or attachment that is configured to introduce beneath the underside of wheeled outdoor equipment and operated for blowing air upwardly to clean debris from the underside of mower decks, snow blowers, vehicles or the like.

The present invention provides a tubular extension pipe assembly, with a 75 to 90° reduced tapered angle end blower pipe fitting to be able to reach under equipment and direct the air flow upwards for cleaning.

Preferably, the extension pipe includes an elongate pipe section and an angled portion between inlet and outlet ends of the elongate pipe section. The angled portion may be formed by either a flexible pipe or a pair of fixedly interconnected pipe segments forming an obtuse angle.

A stabilizing handle mounted on the elongate pipe section is for directing the bottom flexible pipe and the high speed air stream to the desired location. Connecting means insures the tight fit of the extension pipe assembly to the existing blower tube for optimal high speed air stream and prevents the extension pipe assembly and stabilizing handle from accidentally coming off during operation.

BRIEF DESCRIPTION OF THE DRAWINGS

Other objects, features and advantages will occur from the following description of a preferred embodiment and the accompanying drawings, in which.

REFERENCE NUMERALS

Figure 1:
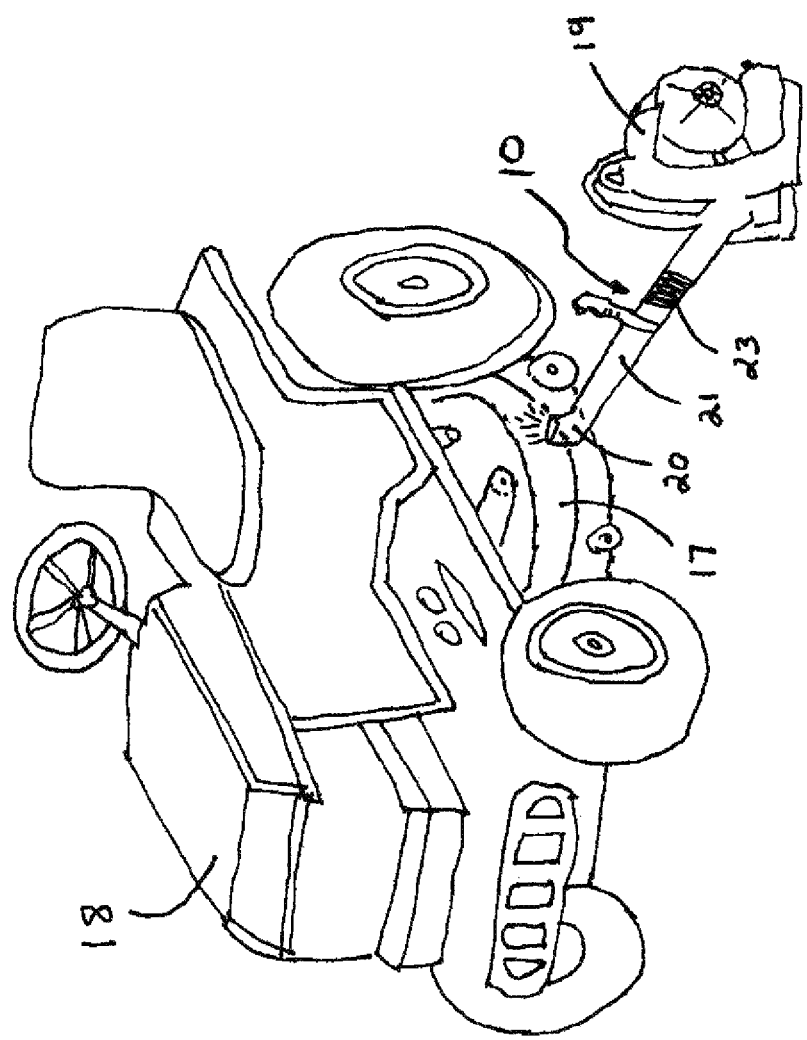
FIG. 1 is a perspective view of a riding mower and a power blower employing one embodiment of the blower extension pipe assembly being used to clean the underside of the deck of a riding lawn mower according to the present invention.

10: Blower pipe extension assembly
10*b*, 10*c*: Alternative versions of pipe extension assembly
14: Elongate pipe section inlet
16: Elongate pipe section outlet
17: Mower cutting deck
18: Mower
19: Blower
20: End elbow blow-off pipe fitting
20*a*, 20*b* Alternative embodiments of end pipe fitting
21: Elongate pipe section
21*a*, 21*b*: Alternative embodiments of elongate pipe section
22: Quick clasps

23: Flexible pipe
23a: Angle fitting
24: Molded L-slotted connector
25: Optional handle
27: Intermediate pipe segment
28, 28a: Blow-off opening

DETAILED DESCRIPTION OF PREFERRED EMBODIMENTS

In the following, an embodiment of the present invention will be described with reference to the accompanying drawings.

FIG. 1 is a perspective view of a lawn mower 18, lawn mower cutting deck 17 and blower 19 as a power working machine on which a blower pipe extension assembly 10 of this embodiment is mounted. Air taken from the air-intake vents of the blower machine 19 is compressed and forced by means of the blower fan through an attached air blowing extension pipe or barrel assembly 10 shown alone in FIG. 2. The blower extension pipe assembly comprises an elongate pipe section 21 having opposing inlet and outlet ends 14 and 16 respectively. More particularly, a flexible pipe section 23 is connected to the standard air outlet of blower machine 19 as described below. An intermediate blower pipe segment 27 is communicably connected to flexible pipe section 23. An angled or elbow-shaped end pipe fitting 20 is releasably attached to intermediate blower pipe segment 27 at outlet end 16.

The air stream from machine 19 is directed through elongate pipe section 21 and blown off through a discharge or blow-off opening 28 of end pipe 20 formed at the downstream end of the elongate blower pipe 21. The discharged compressed air stream is directed at the underside of the mower deck 17 and the debris under the mower deck or like equipment is air blasted off of that underside.

Inlet end 14 is connected to the standard power blower air outlet by means of quick clasp 22 or L-slot grooves 24. Clasp 22 can be tightened to provide a secure connection and improved air discharge force.

Figure 2:
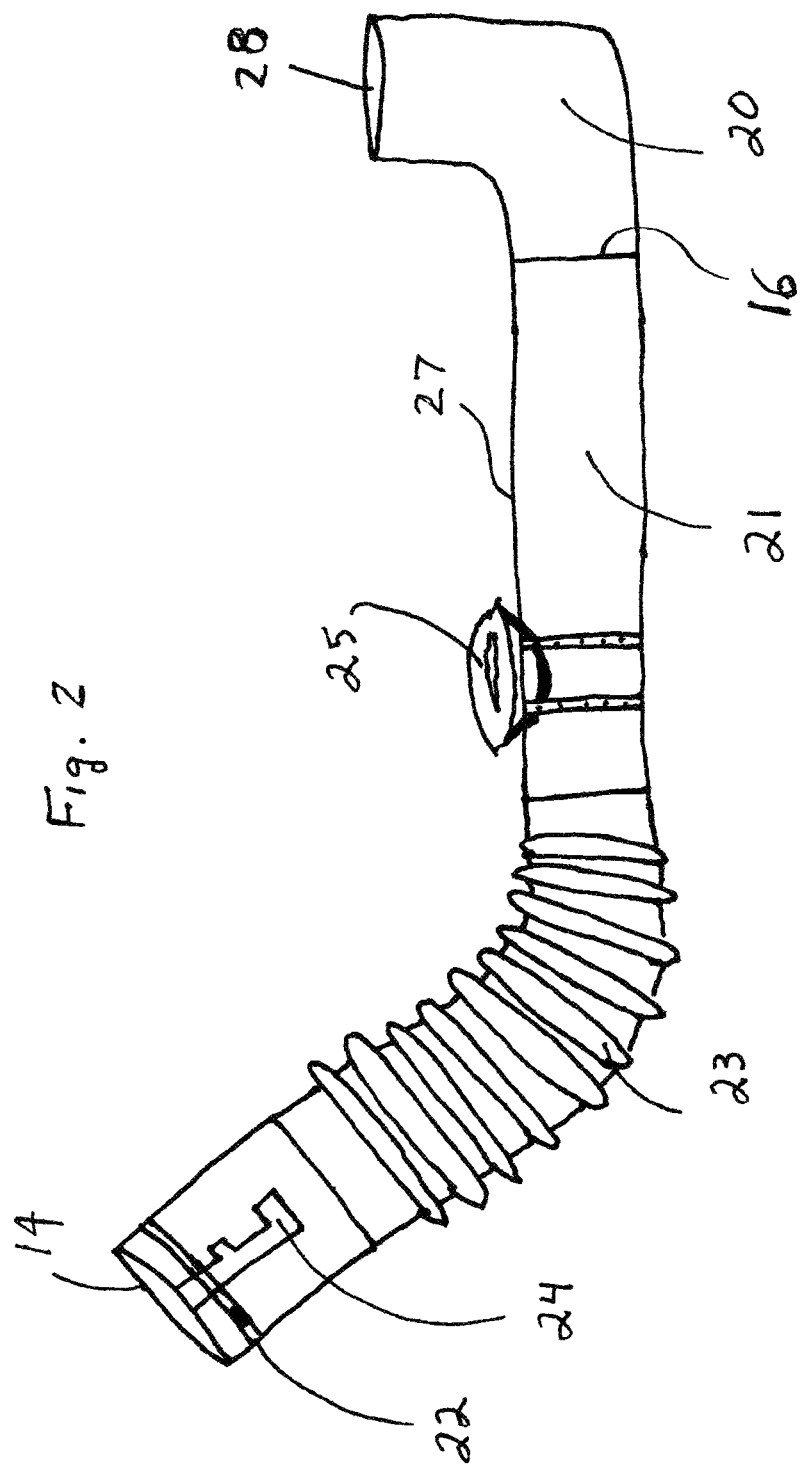
FIG. 2 is a perspective side view of the blower extension pipe assembly shown in FIG. 1, wherein the existing blower discharge pipe and extension pipe assembly are connected with flexible piping and a handle is attached to the extension for maneuvering the assembly to clean the underside of wheeled outdoor equipment

FIG. 2 also shows the end pipe fitting 20 attached to outlet end 16 of elongate pipe section 21. A stabilizing handle 25, attached to pipe section 21 by clasps, is held by the user and manipulated to direct the air flow when sitting the blower on the ground for larger mowers, equipment or the like.

Figure 3:
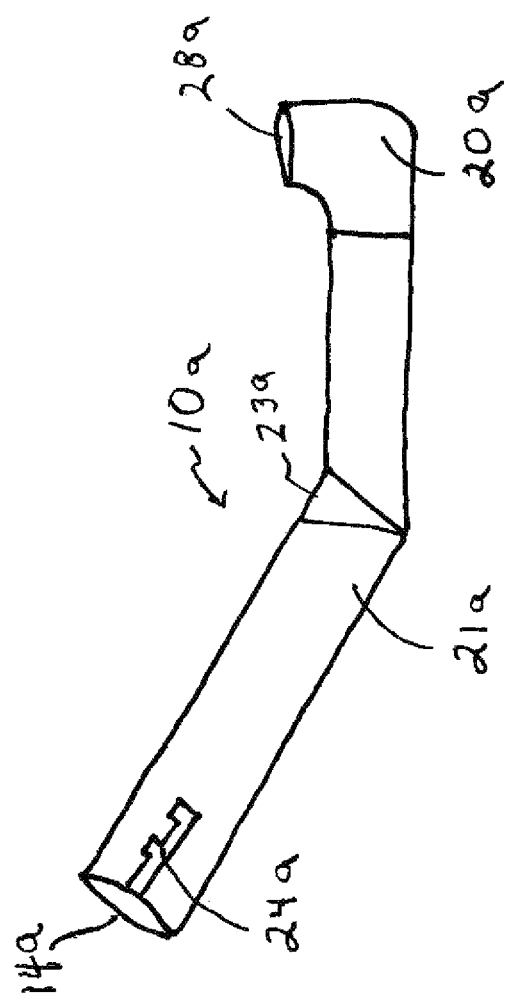
FIG. 3 is a perspective view of an alternative blower extension pipe assembly for use in the method of this invention, wherein the assembly is viewed from the side and attached to the blower machine utilizing the blower manufacturer's L-slot connectors.

FIG. 3 shows an alternative blower pipe assembly 10a, which again carries an angled or elbow-shaped end pipe fitting 20a. End pipe fitting 20, 20a includes a blow-off opening 28, 28a and is formed as a 90° shaped fitting that is decreased in output diameter. As previously described, the end fitting may include an angle of 75° to 90°. The end pipe fitting 20a can be adjustable or fixed and is designed to fit under the deck of the machine to be cleaned and enable an operator to easily apply the high speed air stream to the underside of that machine. The blower machine can be operated while holding it by the operator's hand, by suspending it from operator's shoulder or by sitting it close by the machine to be cleaned.

Elongate pipe section 21a also has a 45° angle fitting 23a that is angled for the end pipe 20a to fit under the equipment. The end pipe fitting preferably incorporates a reduced diameter pipe discharge opening that increases the exiting air flow to increase the cleaning force.

An L-slotted molded connector 24a again operates as connecting means for tightly connecting the inlet end of elongate pipe section 21a to the blower machine 19. The fitting our coupling formed at the upstream or inlet end of assembly 10, 10a opposite to the end pipe fitting 20, 20a is molded to include two L-shaped locking grooves 24, 24a to fit and attach to existing manufacturers' blower pipe models.

Figure 4:
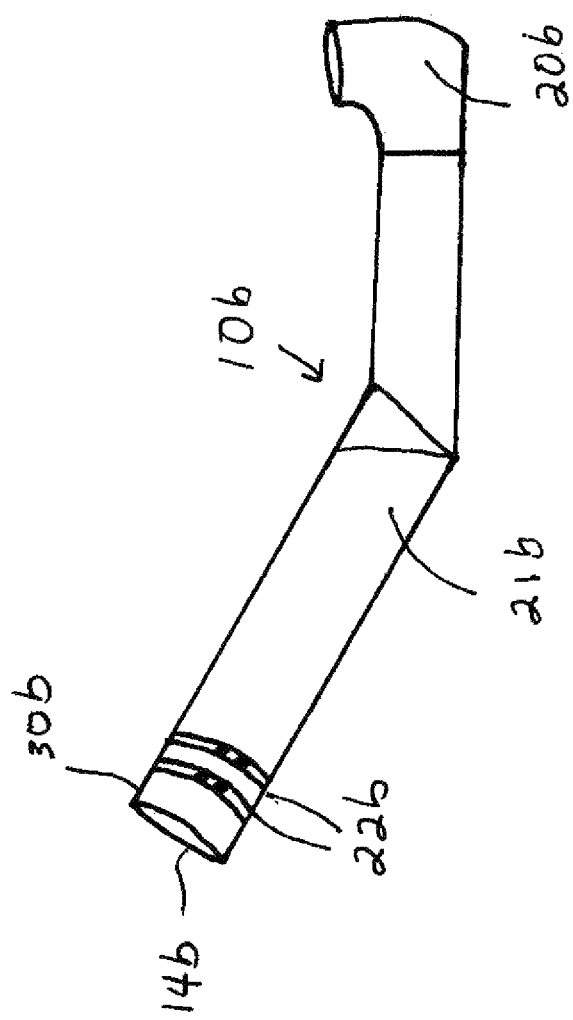
FIG. 4 is a perspective view of a modified version of the blower extension pipe assembly shown in FIG. 3, wherein the extension pipe is viewed from the side and attached to the blower machine utilizing a rubber coupling and quick clasps.

FIG. 4 is a view showing the pipe extension assembly 10b as in FIG. 3, but utilizing a rubber coupling 30b at inlet end 14b and quick clasps 22 or hose clamps as connecting means to fit unusual size blower output tubes.

A polyethylene alloy or the like can be used as a material to prepare the blower pipe 20, 21 and 23. The material is melted and introduced into a mold having a desired shape, and air is blown to obtain an integrally molded product. The blower pipe may also be prepared by other means or methods to reduce the cost of the product.

The connectors for the individual pipe sections 20, 21 and 23 can also use a rubber coupling with quick clasps so a tight fitting will be established with different sizes of existing blower pipes.

In operation, a piece of wheeled outdoor equipment is cleaned in accordance with the following steps:

Stop and shut off the machine to be cleaned; raise the deck or area to be cleaned to its highest setting above the ground.

Attach the inlet end 14, 14a, 14b of elongate pipe section 21, 21a, 21b to the blower 16 using either the existing screw-on L shaped attachment that is manufactured on most blowers or the supplied coupling with quick clasps. If end pipe fitting 20, 20a, 20b is adjustable, adjust to desired angle.

Set the blower on the ground next to the machine to be cleaned, and start the blower, setting the throttle on full speed. Make sure the operator uses safety glasses. Grasp the stabilizing handle 25, FIG. 21 on the extension pipe assembly (if provided) and move the elongate pipe section 21 under the equipment to be cleaned. If using the cleaning end pipe fitting on a smaller hand blower or large backpack blower, after lifting the blower up or strapping it on, grasp the throttle handle and move the blower pipe assembly back and forth underneath the deck area to be cleaned.

When no more debris comes out from under the equipment, shut off the blower, remove the blower extension pipe assembly and store it for the next cleaning.

The advantages of the present invention include, without limitation, fast cleaning of grass, leaves and other debris from under lawn mower decks, snow blowers, vehicles and other equipment with hard to reach areas.

This attachment solves a major OSHA safety concern. The device greatly increases personal safety while decreasing insurance/workman compensation claims. Currently, lawn professionals and homeowners must turn over their mowers, mower decks or similar equipment or jack up the equipment to reach under with their arms and hands to hand scrape the buildup of grass and debris which is time consuming, dangerous and dirty work. The machine can fall on the operator; the operator can be cut by the sharp blades while scraping off the grass under the deck or get burned by accidentally touching the hot engine and parts. Afterwards, from lying on the ground to reach under the deck, the operator has to clean up their tools, hands and clothes. With the current invention, one could quickly install the end pipe on their blower, start the blower and safely direct the high speed air up and under the machine while standing out of harm's way, cleaning it for immediate continuation of work or storage.

Another advantage addresses a major concern of the Department of Agriculture and the property owners; the disclosed technique provides for a clean machine that reduces the spreading of fungus, bugs, diseases, and weeds from one property to another.

Another advantage of the present invention is the savings of wear and tear on the machines. By keeping the equipment clean, the homeowner and landscaper has charger blades, longer engine lift, longer blade and drive belt life and added fuel efficiency which is a big advantage in these economic times of high gas and spare part prices.

Another advantage of the present invention is it can be used with all models of equipment and is reusable. Also every landscape or lawn service company and the average homeowner already have "leaf blowers", so purchasing an adapter to fit the equipment that's already owned would be economical and practical.

From the foregoing it may be seen that the apparatus of this invention provides for blower pipe extension assembly which is connected to the air blow-off port of a power blower and used to clean the underside of a lawn mower or other wheeled outdoor equipment. While this detailed description has set forth particularly preferred embodiments of the apparatus of this invention, numerous modifications and variations of the structure of this invention, all within the scope of the invention, will readily occur to those skilled in the art. Accordingly, it is understood that this description is illustrative only of the principles of the invention and is not limitative thereof.

Although specific features of the invention are shown in some of the drawings and not others, this is for convenience only, as each feature may be combined with any and all of the other features in accordance with this invention.

Other embodiments will occur to those skilled in the art and are within the following claims:

What is claimed is:

1. A method for cleaning an underside of an upright riding lawn mower deck, which underside is supported above the ground by a plurality of wheels, without having to tip the riding lawn mower on its side, said method comprising:
   providing a power blower that is operated to blow air therefrom;
   providing an elongate blower pipe extension having an upper pipe segment with an inlet end formed therein, an intermediate pipe segment, an obtuse angle pipe segment communicably interconnecting said upper pipe segment and said intermediate pipe segment, and an elbow end pipe including a first elbow end pipe segment axially aligned with and communicably connected to said intermediate pipe segment and a second elbow end pipe segment that is fixedly and communicably joined at an angle of 75°-90° to said first elbow end pipe segment and has a discharge opening formed therein, which discharge opening is directed at an angle of 75°-90° to a longitudinal axis of said intermediate pipe segment;
   attaching said elongate blower pipe extension to said power blower such that said inlet end of said upper segment is communicably interengaged with said power blower;
   positioning said power blower and said elongate blower pipe extension such that said obtuse angle pipe segment engages the ground and said intermediate pipe segment is extended longitudinally across the ground; and
   cleaning the underside of the upright riding lower mover while the upright riding lawn mower is standing on the ground by:
      introducing said intermediate pipe segment and said elbow end pipe between the ground and the underside of the upright riding lawn mower deck;
      directing said discharge opening of said second elbow end pipe segment upwardly to face the underside of the upright riding lawn mower deck; and
      operating said power blower to blow air through said blower extension pipe and outwardly from said discharge opening of said second elbow end pipe segment in an upward direction disposed at an angle of 75°-90° to said longitudinal axis of said intermediate pipe segment and the ground along which said intermediate pipe segment is extended, and against the underside of the upright riding lawn mower deck such that debris is cleaned from the underside of the upright riding lawn mower deck.

2. The method of claim 1 further including the step of elevating the upright riding lawn mower deck sufficiently above the ground to provide clearance for extending said intermediate pipe segment and said elbow end pipe beneath the upright riding lawn mower deck.

3. The method of claim 1 further including the step of providing said second elbow pipe segment with a reduced diameter discharge opening.

4. The method of claim 1 further including the step of providing said obtuse angle pipe segment with a fixed obtuse angle.

5. A method for cleaning an underside of an upright riding lawn mower deck, which underside is supported above the ground by a plurality of wheels, said method comprising:
   providing a power blower that is operated to blow air therefrom;
   providing an elongate blower pipe extension having an upper pipe segment with an inlet end formed therein, an intermediate pipe segment, an obtuse angle pipe segment communicably and fixedly interconnecting said upper pipe segment and said intermediate pipe segment, and an elbow end pipe including a first elbow end pipe segment axially aligned with and communicably connected to said intermediate pipe segment and a second elbow end pipe segment that is fixedly and communicably joined at an angle of 75°-90° to said first elbow end pipe segment and has a reduced diameter discharge opening formed therein, which discharge opening is directed at an angle of 75°-90° to a longitudinal axis of said intermediate pipe segment;
   attaching said elongate blower pipe extension to said power blower such that said inlet end of said upper segment is communicably interengaged with said power blower;
   positioning said power blower and said elongate blower pipe extension such that said obtuse angle pipe segment engages the ground and said intermediate pipe segment is extended longitudinally across the ground; and
   cleaning the underside of the upright riding lower mover while the upright riding lawn mower is standing on the ground by:
      introducing said intermediate pipe segment and said elbow end pipe section between the ground and underside of the upright riding lawn mower deck;
      directing said discharge opening of said second elbow end pipe segment upwardly to face the underside of the upright riding lawn mower deck; and
      operating said power blower to blow air through said blower extension pipe and outwardly from said discharge opening of said second elbow end pipe segment in an upward direction disposed at an angle of 75°-90° to said longitudinal axis of said intermediate pipe segment and the ground along which said intermediate pipe segment is extended and against the underside of the upright riding lawn mower deck such that debris is cleaned from the underside of the upright riding lawn mower deck.

6. The method of claim 5 further including the step of elevating the upright riding lawn mower deck sufficiently above the ground to provide clearance for extending said intermediate pipe segment and said elbow end pipe beneath the upright riding lawn mower deck.

\* \* \* \* \*